(12) United States Patent
King et al.

(10) Patent No.: US 6,280,497 B1
(45) Date of Patent: Aug. 28, 2001

(54) CORED WIRE FOR TREATING MOLTEN METAL AND METHOD OF MANUFACTURE

(75) Inventors: Phillip Ronald King, Winsted, CT (US); Richard Shaddinger Baum, Allentown, PA (US)

(73) Assignee: Minerals Technologies Inc., Bethlehem, PA (US)

( * ) Notice: Subject to any disclaimer, the term of this patent is extended or adjusted under 35 U.S.C. 154(b) by 0 days.

(21) Appl. No.: 09/532,610

(22) Filed: Mar. 22, 2000

Related U.S. Application Data

(62) Division of application No. 09/000,990, filed on Dec. 30, 1997, now Pat. No. 6,053,960.

(51) Int. Cl.[7] .................................................... C21C 1/02
(52) U.S. Cl. ........................... 75/304; 75/314; 75/316; 75/567; 75/746; 75/770
(58) Field of Search ....................... 75/375, 746, 770, 75/304, 314, 316, 567

(56) References Cited

U.S. PATENT DOCUMENTS 3,777,361 * 12/1973 Fuchs, Jr. .......................... 29/470.6
4,832,742 * 5/1989 Ototani .................................. 75/304

* cited by examiner

*Primary Examiner*—Melvyn Andrews
(74) *Attorney, Agent, or Firm*—Marvin J. Powell; Terry B. Morris

(57) ABSTRACT

A cored wire continuously formed by continuously inserting an extruded core inside a continuously roll formed sheath, the peripheral edges of the roll formed sheath joined by a continuous lock seam. Inspection of the partially formed lock seam at a designated process step serves to warn the user of malformed or defective lock seam portions in the finished cored wire.

3 Claims, 4 Drawing Sheets

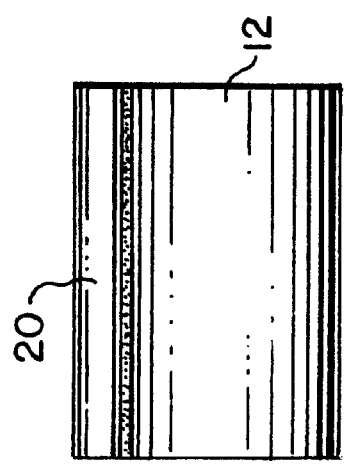
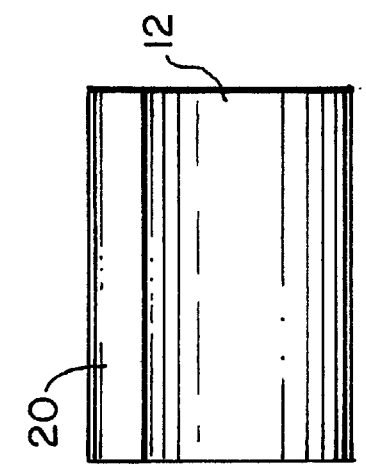
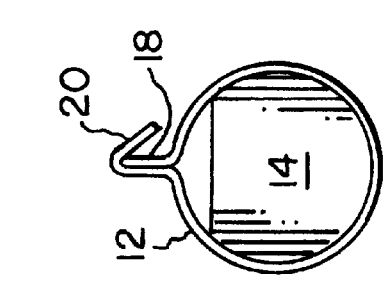
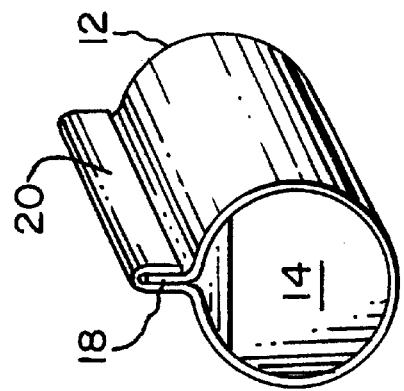
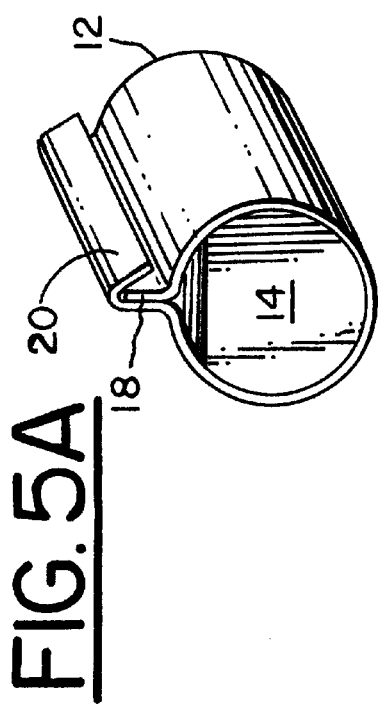
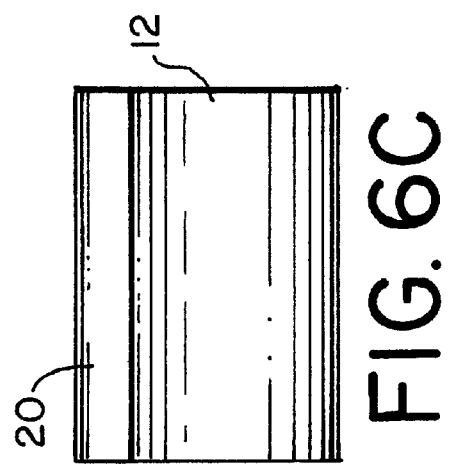

CORED WIRE FOR TREATING MOLTEN METAL AND METHOD OF MANUFACTURE

This application is a division of U.S. patent application Ser. No. 09/000,990 filed Dec. 30, 1997, now U.S. Pat. No. 6,053,960.

BACKGROUND OF THE INVENTION

The present invention pertains to cored wires for treating molten metals to remove unwanted impurities and in particular to the manufacture of cored wires having a reactive metal core.

Cored wires, in particular a calcium core surrounded by a sheath has found wide application in the treating of molten ferrous metals. The cored wire is used to introduce calcium into the molten ferrous metal, after being tapped from a furnace, in order to reduce unwanted elements such as sulfur and oxygen in the molten bath. A detailed discussion of the overall process is contained in U.S. Pat. No. 4,481,032, the specification of which is incorporated herein by reference.

U.S. Pat. Nos. 4,512,800, 4,705,261, 4,094,666, 4,698,095, 4,035,892, 4,097,268, and 4,671,820 all disclosed various methods of treating molten metals using a clad reactive cored metal composite in the form of an enlongated wire.

In one method of manufacture, a calcium metal core is extruded into an elongated shape or wire which has a generally circular cross section. The core wire is inserted into a metallic sheath, e.g. steel, as it is continuously roll formed into a tube. The tube is formed with a mechanical lock seam so that reactive metal, e.g. calcium, is encapsulated or locked inside. The resulting structure or product is a continuous tube or wire being a composite of a reactive core and a roll formed metallic sheath. One of the problems with the prior art roll forming process is insertion of the core into the metallic sheath.

Another problem with the prior art process has been monitoring the roll forming process to identify a problem with the lock seam at the earliest possible stage of the process in order to prevent excessive amounts of malformed lock seams and thus scrap cored wire.

BRIEF SUMMARY OF THE INVENTION

In order to facilitate the production of a suitable cored wire having a reactive metal core it has been discovered that insertion of the extruded reactive core material (wire) into the roll formed sheath can be delayed until that time in the process where the sheath has been partially formed and that the roll forming of the sheath can be married to a continuous extrusion of the solid core to achieve an improved cored wire.

Therefore, in one aspect, the present invention is a cored wire for introducing a reactive metal into a bath of molten metal produced by extruding the reactive metal into an elongated core wire having a generally cylindrical shape with a continuous flat surface, concurrently with the extrusion of the reactive metal core partially roll forming a sheath using a multi-step roll forming process, the sheath partially formed into a generally trough shaped member with peripheral edges having formed therein surfaces adapted to be mated and formed into a lock seam, inserting the core wire into the trough shaped portion of the partially formed sheath with the flat surface portion of the core positioned to accommodate a lock seam to be formed into the sheath and thereafter finishing the cored wire by further roll forming steps including closing the sheath around the cored wire and forming a continuous folded lock seam in the sheath.

In another aspect, the present invention is a method for forming a cored wire for treating a bath of molten metal comprising the steps of extruding a reactive metal core material into an elongated core wire having a generally cylindrical shape with a continuous flat surface, concurrently partially roll forming a sheath using a multi-step roll forming process, the sheath partially formed into a generally trough shaped member with peripheral edges having formed therein surfaces adapted to be mated and formed into a lock seam, inserting the core wire into the trough shaped portion of the partially formed sheath with the core positioned to accommodate a lock seam to be formed in the sheath and finishing manufacture of the cored wire by further roll forming steps closing the sheath around the cored wire and forming a continuous lock seam in the sheath.

In yet another aspect the present invention is a process for forming a cored wire wherein a core is surrounded by a metallic sheath closed by a mechanical lock seam, the sheath formed around the core from an elongated strip by a continuous multi-step roll forming process by progressively forming the sheath around the core including a roll forming step wherein the sheath has a generally cylindrical cross sectional shape with mating vertical surfaces used to form the lock seam extending from mating edges of the cylindrical portion of the sheath, the vertical surfaces extending generally perpendicular to a longitudinal axis of the generally cylindrical portion of the sheath with one of the vertical surfaces being longer than the adjacent vertical surface and overlying the adjacent vertical surface at an angle of approximately 45° to the mating surfaces, and continuously observing the roll forming process after this step to determine if the angular relationship between portions of the lock seam is being maintained. If the angular relationship is seen to deviate from that which is described to produce an acceptable lock seam the process can be adjusted or stopped to minimize production of malformed lock seam and consequently scrap cored wire.

It is within the scope of the present invention to use optical or electro-optical means to achieve the inspection step.

BRIEF DESCRIPTION OF THE DRAWING

FIG. 1 is viewed from a reversed perspective of the remaining figures.

FIGS. 5a, 5b and 5c, show a perspective, cross sectional view, and elevational view of the succeeding step in the formation of the closure of the lock seam.

FIGS. 6a, 6b and 6c, show a perspective, cross-sectional view and side elevational view of a further step in the closure of the lock seam according to the present invention.

DETAILED DESCRIPTION OF THE INVENTION

As disclosed in U.S. Pat. No. 4,481,032 a cored wire containing calcium metal in the core is used to introduce calcium metal into a bath of molten metal, e.g. steel for the purposes of deoxidization and desulfurization. The cored calcium wire overcomes the problems of trying to introduce particulate calcium into a molten metal bath especially since the calcium metal has a much lower density than the molten steel and tends to float rapidly to the surface of the molten bath without reacting.

The incorporation of the calcium metal into a metallic sheath in the form of a continuous cored wire was the solution to the problem. In order to produce an acceptable sheath, a roll forming technique has been used wherein the sheath is formed around the core of the reactive metal and closed using a mechanically formed longitudinal lock seam, as is well known in the art.

Figure 1:
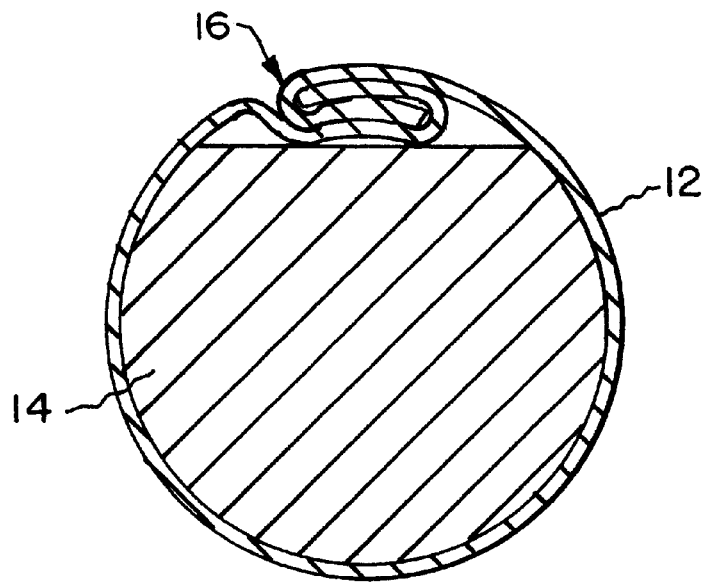
FIG. 1, is a cross section of a cored wire produced according to the present invention illustrating an acceptable lock seam.

Referring to FIG. 1, there is shown a cross section of a cored wire 10 comprising the outer sheath 12 and the inner core 14. As stated before the inner core can be any reactive metal, for example calcium. The outer sheath 12 is preferably formed of a cold roll aluminum killed low carbon steel strip. The outer sheath 12 is continuously formed around the core 14 using a roll forming mill manufactured and sold by Yoder Krasny Kaplan Corporation of Cleveland Ohio. The roll forming process is a multi-step process that starts with a flat steel strip and gradually roll forms it into the shape shown in FIG. 1. The steel strip is formed into a generally cylindrical shape and closed using a lock seam by folding extensions of the peripheral surfaces of the strip as is well known in the art. The lock seam is illustrated at 16 in FIG. 1.

Figure 2:
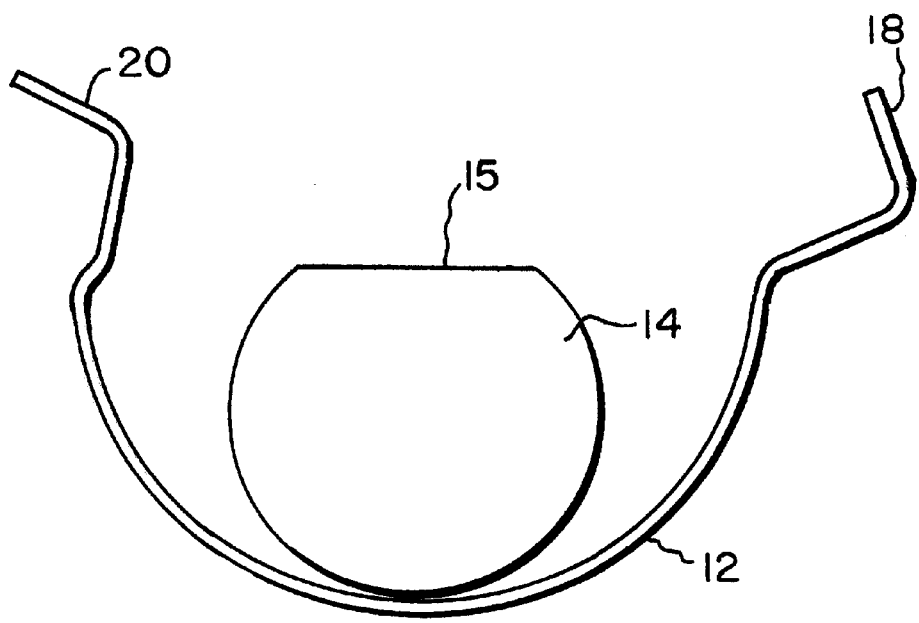
FIG. 2, is a cross section showing the step in the roll forming process of the sheath where the reactive metal core is inserted into the sheath during the roll forming process.

For example, FIG. 2, illustrates one step in the roll forming process wherein the sheath 12 has trough like configuration with the peripheral ends 18 and 20 roll formed to the shape that will eventually form the lock seam. The core wire 14 with a continuous flat surface 15 is continuously extruded contemporaneously with the roll forming of the sheath 12. Prior to the step shown in FIG. 2, where the continuously extruded core 14 is inserted into the partially formed sheath 12, the sheath is formed in a multi-step roll forming process to the shape shown. Thereafter the core 14 and the sheath 12 continue through successive roll forming steps to achieve the wire with a cross sectional configuration as shown in FIG. 1.

Figure 3A:
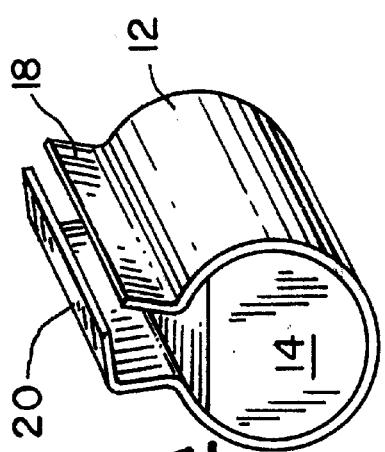
FIGS. 3a, 3b and 3c, show respectively a perspective view, cross sectional view, and longitudinal representation of a first step in the closure of the sheath around the solid core.
Figure 3B:
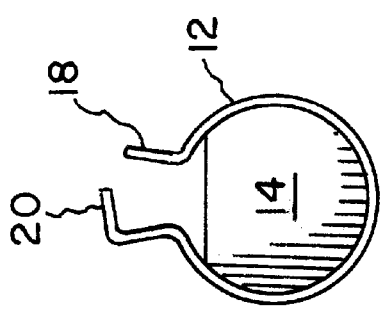
Figure 3C:
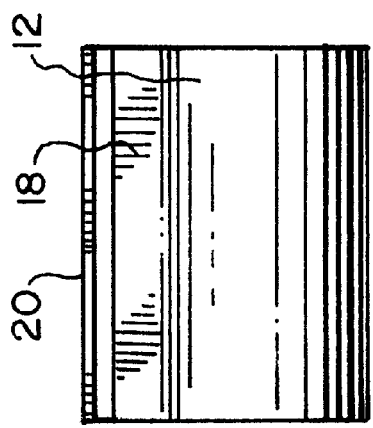
Figure 4A:
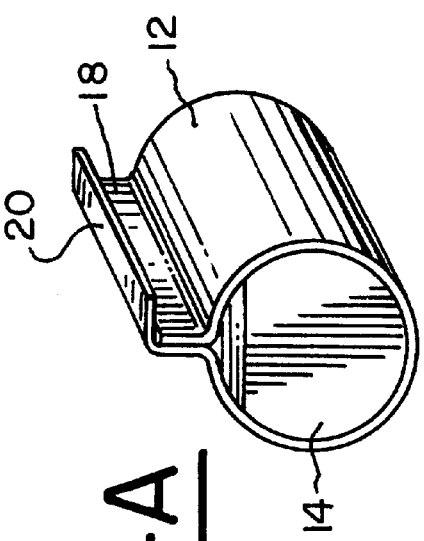
FIGS. 4a, 4b and 4c, show a perspective view, cross sectional view and side elevational view of a further step in the formation of the cored wire according to the present invention.
Figure 4B:
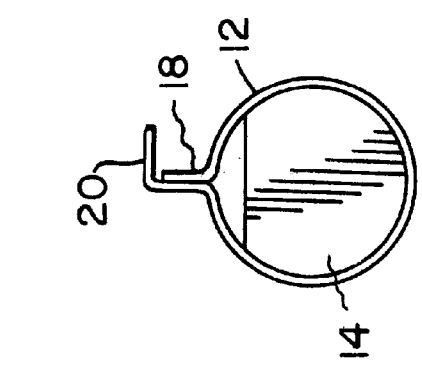
Figure 4C:
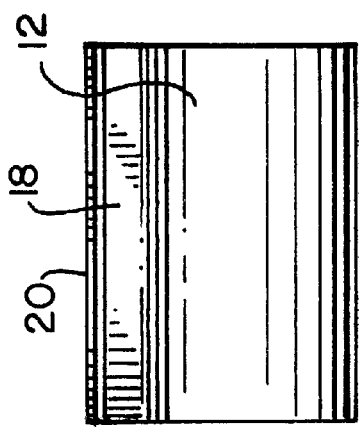

Referring to FIGS. 3a and 3b, the sheath 12 is shown at a step subsequent to the steps shown in FIG. 2, wherein the peripheral edges 18 and 20 are being brought together so that vertical portions of the peripheral surfaces can be mated together as shown in FIGS. 4a, and 4b. Peripheral portion 20 has an extended surface portion, which is bent at a right angle, to overlay peripheral portion 18 as shown in FIGS. 4a and 4b at this stage of the roll forming process. As shown in FIGS. 5a and 5b the overlying portion of peripheral surface 20 is bent at an angle that is approximately 45° to the vertical or 45° to the mating surfaces of the vertical portions of peripheral portions 18 and 20.

FIGS. 6a and 6b show the next step where the overlying portion of peripheral section 20 is folded completely over the vertical portion of peripheral extension 18. Thereafter successive roll forming stages fold the vertical portion over and produce the generally cylindrical shape shown in FIG. 1.

FIGS. 3c, 4c, 5c and 6c are elevational views showing the various lines produced by the edges of the surfaces as they are brought together for folding or crimping.

Figure 8:
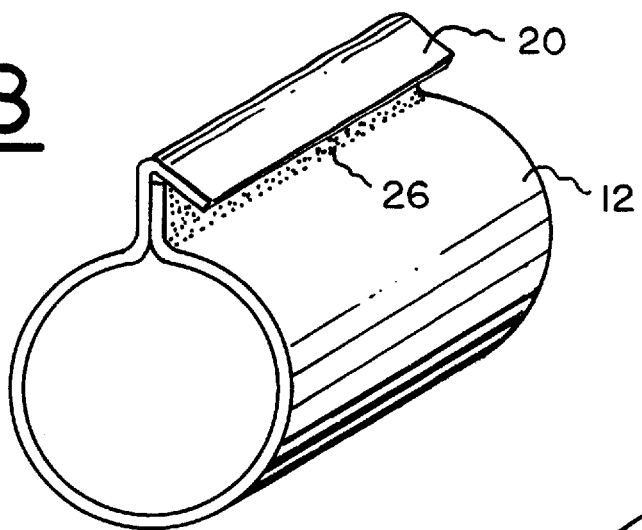
FIG. 8, is a perspective view illustrating the appearance of the shadow from the illumination of FIG. 8.
Figure 7:
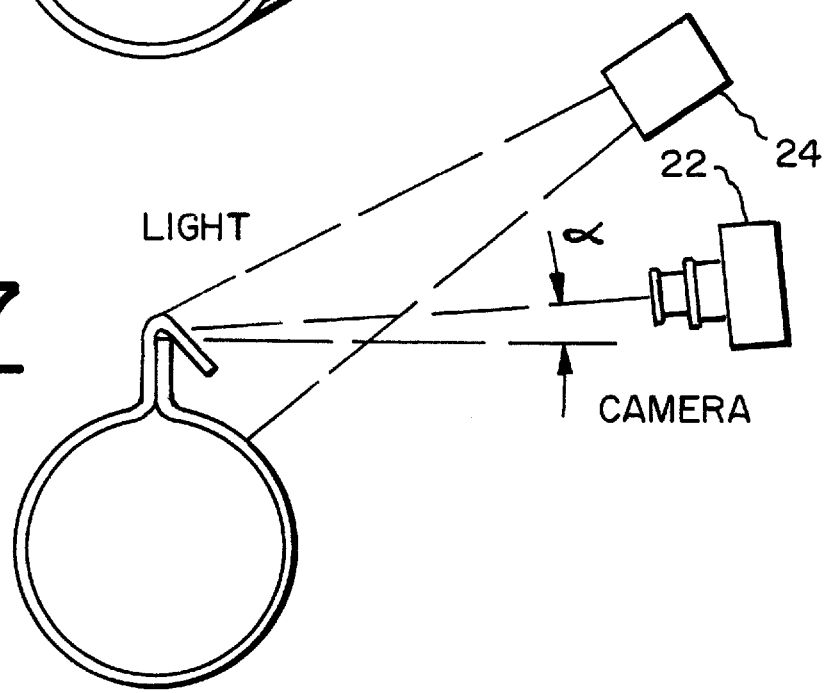
FIG. 7, is a schematic representation of a preferred method of inspecting the lock seam.
Figure 9:
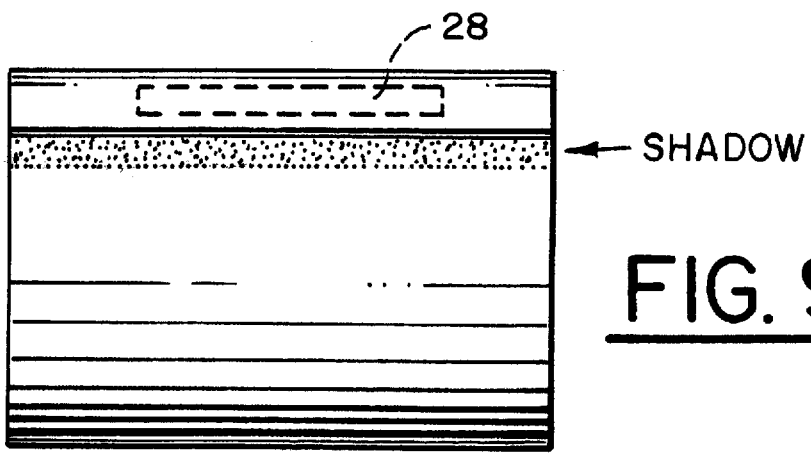
FIG. 9, is an elevational view illustrating the shadow line in relation to the inspection area.

Referring to FIG. 7, there is shown a method of inspecting the lock seam between what would be steps illustrated in FIGS. 5a and 6a of the roll forming process. A camera or other optical device 22 is positioned perpendicular to the pass line of the wire and is elevated at an angle shown as alpha ($\alpha$). According to a preferred embodiment of the present invention the angle alpha is approximately 20°. As shown in FIG. 7, a light source (fiber optic is preferred) 24 is positioned above the camera with a concentrated beam of light in the field of view of the camera as illustrated. The light intensity is adjusted to produce a shadow under the seam overlap as shown at 26 in FIG. 8. In FIG. 9 the inspection area for the camera or optical device 22 is indicated by the dotted line rectangle 28. As shown in FIG. 9, the camera is focused so it monitors the shadow relative to the seam overlap. One particularly effective method of inspection is by using a CV series vision inspection system offered for sale by Keyence Corporation of America having a office in Woodcliff Lake, N.J. The vision system is programmed to monitor the position of the shadow relative to the seam overlap as shown in FIG. 9. The inspection window is positioned near the edge of the overlap and is adjusted so that an acceptable condition occurs when the window is all white in color. An unacceptable condition occurs when the shadow or dark area rises indicating that the seam is malformed or misformed. Thus, the controller will indicate that the number of black pixels as increased beyond the set limit of zero and then change selected outputs in the device. The most common output selected is to automatically stop the wire forming line so that the tooling can be adjusted to bring the peripheral edges of the strip that eventually form the lock seam back into acceptable formed conditions and minimize the amount of misformed or misshaped lock seam and thus scrap wire. Rapid detection of mis-formed or malformed lock seams is of critical importance since the wire is formed at speeds approaching 400 feet per minute.

The method of the present invention is used to form solid core wires having nominal outside diameters of 5 mm (0.197 inches) and 8 mm (0.32 inches) comprising a calcium metal core in a low carbon aluminum killed steel.

Having thus illustrated and described my invention herein with reference to certain specific embodiments, the present invention is nevertheless not intended to be limited to the details shown. Furthermore, various modifications may be made in the details within the scope of the invention that is defined in the appended claims.

What is claimed is:

1. A cored wire comprising a reactive metal inner core and a sheath comprising a continuous lock seam for introducing a reactive metal into a bath of molten metal produced by:

extruding said reactive metal into an elongated core wire having a generally cylindrical shape with a continuous flat surface;

concurrently partially roll forming a sheath using a multi-step roll forming process, said sheath partially formed into a generally trough shaped member with peripheral edges having formed therein surfaces adapted to be mated and formed into a lock seam;

inserting said core wire into said trough shaped portion of said partially formed sheath with said core wire positioned to accommodate a lock seam to be formed in said sheath; and finishing said cored wire by further roll forming steps to close said sheath around said core wire and forming a continuous lock seam in said sheath.

2. A cored wire according to claim 1 wherein said core wire is calcium metal.

3. A cored wire according to claim 1 wherein said sheath is a low carbon aluminum killed steel.

\* \* \* \* \*